United States Patent [19]
Davis et al.

[11] 4,060,250
[45] Nov. 29, 1977

[54] ROTOR SEAL ELEMENT WITH HEAT RESISTANT ALLOY COATING

[75] Inventors: Hugh M. Davis, Trenton, N.J.; Alan H. Miller, Philadelphia, Pa.

[73] Assignee: De Laval Turbine Inc., Princeton, N.J.

[21] Appl. No.: 738,903

[22] Filed: Nov. 4, 1976

[51] Int. Cl.² .......................... F16J 15/44; F01D 5/28
[52] U.S. Cl. .............................. 277/53; 277/DIG. 6; 415/172 R; 415/174
[58] Field of Search .................... 277/53, 224, DIG. 6; 415/113, 172 R, 172 A, 173 R, 173 A, 174, 170 R

[56] References Cited

U.S. PATENT DOCUMENTS

| 2,732,232 | 1/1956 | Whitfield | 277/53 X |
| 2,851,289 | 9/1958 | Pederson | 415/174 |
| 2,998,991 | 9/1961 | Spencer | 415/174 X |
| 3,339,933 | 9/1967 | Foster | 277/53 |
| 3,503,616 | 3/1970 | Hickey | 277/53 X |
| 3,701,536 | 10/1972 | Matthews et al. | 415/172 A X |
| 3,823,950 | 7/1974 | Pederson | 277/53 X |
| 3,836,156 | 9/1974 | Dunthorne | 277/53 |
| 3,879,831 | 4/1975 | Rigney et al. | 415/174 X |
| 3,964,877 | 6/1976 | Bessen et al. | 415/174 X |

FOREIGN PATENT DOCUMENTS 575,620   2/1946   United Kingdom .......... 277/DIG. 6

OTHER PUBLICATIONS

Mechnical Engineer's Handbook, T. Baumeister, ed., (McGraw-Hill:1958), pp.: Title page, and (6–105)–(-6–11), Copy in Art Unit 241, U.S. Patent Office.

Primary Examiner—Robert S. Ward, Jr.
Attorney, Agent, or Firm—Hopgood, Calimafde, Kalil, Blaustein and Lieberman

[57] ABSTRACT

The disclosure relates to rotary machinery, including a wear ring seal member stationarily mounted in a holding member which extends generally coaxially about a rotatable cylindrical member in substantially sealing relationship with the surface of the rotatable member, the rotatable member being made of carbon steel. The improvement resides in providing the surface of the rotatable carbon steel member in sealing relationship with the ring seal with a fused alloy coating metallurgically bonded thereto, the coating being formed of a heat and corrosion resistant welding alloy composition containing about 10% to 30% by weight chromium and the balance at least about 60% nickel, such that the carbon steel member is protected against oxidation and ignition due to overheating.

6 Claims, 5 Drawing Figures

ROTOR SEAL ELEMENT WITH HEAT RESISTANT ALLOY COATING

This invention relates to an assembly comprising a wear ring seal member in combination with a rotatable cylindrical member of steel in rotary machinery, such as centrifugal compressors and, in particular, to an assembly comprising at least one rotary impeller journaled within a stationary seal supported by a seal-holding member.

STATE OF THE ART

The internal seals of centrifugal compressors comprise stationary seal-holding elements positioned with a small clearance relative to the cylindrical surface of a rotor. During normal operation, the seals do not touch. However, during periods of upset or mal-operation, the seals can rub against the rotor shaft or against the hub of an impeller and generate considerable heat.

A typical seal is made from a temperature-stable plastic, such as the plastic known by the trademark Teflon which is made of polytetrafluoroethylene. The preferred seal comprises a sintered composition of Teflon particles with fine particles of alumina dispersed through the matrix thereof. Examples of seal assemblies are given in U.S. Pat. No. 3,823,950 which issued on July 16, 1974.

As stated hereinabove, when a particular seal rubs against a rotary member which it is sealing, considerable heat of friction is generated. This can be very dangerous, especially in compressors handling dry chorline gas and where the rotating element is a low alloy carbon steel, such as a steel known by the designation HY80. For example, the ignition temperature of carbon steel in dry chlorine gas can be reached when the seal rubs which can result in an internal fire in the compressor and cause considerable damage.

It would thus be desirable to provide a seal assembly in which the carbon steel is protected from elevated ignition temperature due to the heat of friction when the seal contacts the rotary element.

OBJECTS OF THE INVENTION

It is thus an object of the invention to provide a seal assembly for rotary machinery in which carbon steel rotary elements are protected againt ignition due to heat of friction.

Another object is to provide a seal assembly for compressors, e.g. centrifugal compressors, for use in compressing dry chlorine gas in which rotary elements made of carbon steel are protected against ignition due to the heat of friction arising from contact with stationary seal elements.

These and other objects will more clearly appear from the following disclosure and the accompanying drawings, wherein.

SUMMARY OF THE INVENTION

We have found that rotary elements of carbon steel can be protected against possible ignition due to heat of friction by inlaying or coating the seal-cooperating surface with a corrosion and heat resistant alloy, such as a chromium-containing nickel-base alloy, particularly a welding alloy known by the trademark Inconel 82. The composition of this alloy comprises by weight approximately 0.1% C, 2.5% to 3.5% Mn, 3% Fe, 0.5% Si, 0.5% Cu, 0.75% Ti, 18% to 22% Cr, 2% to 3% Nb+Ta and the balance at least about 67% Ni.

Another composition of a welding alloy similar to but broader than the foregoing alloy comprises by weight up to about 0.25% C, about 0.5% to 5% Mn, 0 to 5% Fe, 0 to about 1% Si, 0 to 1% Cu, about 0.1 to 1% Ti, about 10% to 30% Cr, about 0.5% to 5% Nb+Ta and the balance at least about 60% nickel. In its broader aspects, the welding alloy comprises a chromium-containing, nickel-basc alloy containing by weight about 10% to 30% Cr and the balance at least about 60% nickel.

One aspect of the invention is directed to a rotary machinery, including a wear ring seal member, stationarily mounted in a holding member which extends generally coaxially about a rotatable cylindrical member in substantially sealing relationship with the surface of said rotatable cylindrical member, the rotatable member being made of carbon steel. Among the low alloy carbon steels included are those containing about 0.1% to 0.5% by weight of carbon. Such steels may contain small amounts of nickel, chromium and molybdenum. The surface of the rotatable cylindrical member is characterized by a fused alloy coating metallurgically bonded thereto, preferably Inconel 82, mentioned hereinabove.

DETAILS OF THE INVENTION

Figure 1:
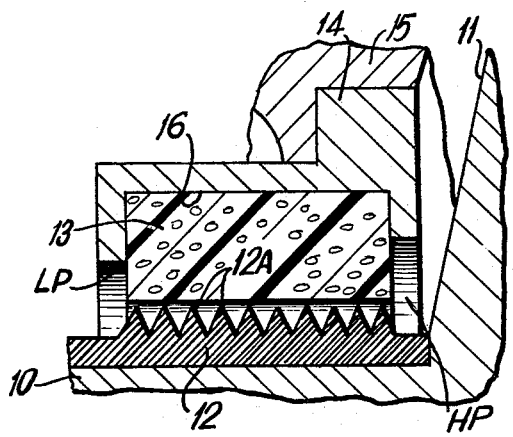
FIGS. 1 and 2 are illustrative of typical seal assemblies employed in rotary machinery, the figures also showing the particular stationary seal in question in sealing relationship with a hub of an impeller coated with a corrosion and heat resistant alloy.
Figure 2:
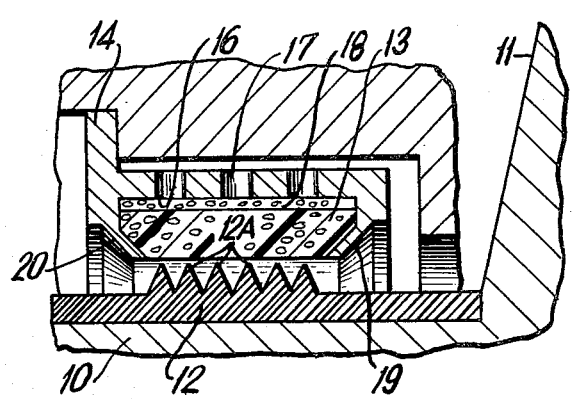

Examples of seal assemblies are given in FIGS. 1 and 2 in which like numerals are indicated for the same parts.

Referring to the embodiment of FIG. 1, a wear ring assembly is shown in cross section comprising a hub or shaft 10 of impeller 11 of carbon steel, the surface of the hub havng an inlay or fused coating 12 of a corrosion and heat resistant chromium-containing nickel-base alloy as shown. The coated hub is in sealing relationship with a plastic wear ring seal 13. A wear ring seal holder member 14 is provided mounted within casing 15 of the rotary machine which may comprise a turbine, a compressor, centrifugal pump, or the like. The holder member is provided with an annular channel 16 for receiving and holding the plastic ring which is preferably made of sintered Teflon (polytetrafluoroethylene) having fine particles of alumina dispersed therethrough.

The seal assembly has a high pressure side HP and a low pressure side LP, the pressure on the high pressure side being operable to urge the plastic seal to the low pressure side and cause it to deform. As will be noted, the seal does not quite touch the coating 12 of rotary hub or shaft 10. The coating is shown with serrated or labyrinth teeth 12A cut therein, the number of teeth being sufficient to encompass the working face of seal 13. Thus, with slight deformation of the seal, contact is made with the projecting teeth on the rotary surface, thus leading to the generation of heat by friction. This heat may be sufficient to cause the carbon steel to ignite, except that this is avoided by interposition of fused coating 12 of a corrosion and wear resistance nickel-chromium alloy between the stationary plastic seal and the surface of the rotary member.

Another seal arrangement is shown in FIG. 2 in which the seal holding member 14 is provided with high pressure fluid release vents or ports 17 passing through the seal holder member, the holder member having a space 18 between the roof of the channel 16 and the plastic seal which is occupied by a porous material having a multiplicity of interstices which act as passageways for directing high pressure fluid radially, axially and circumferentially of the weal ring 13 so as to communicate space 18 with the low pressure region through vents 17. The porous material in the form of a ring may be a fiber metal, such as the material sold under the trademark Felt Metal by the Hyck Metals Company of Milford, Connecticut. In the alternative, fine wire mesh or a porous sintered ceramic material may also be effectively utilized. Thus, any high pressure fluid which may penetrate into space 18 is immediately exhausted through ports or vents 17.

As will be noted, the plastic seal is held in place by annular legs 19 and 20 and does not quite touch the rotary surface of the shaft or hub 10 of the impeller 11. However, during operation, the seal may extend to the rotating surface and develop heat by friction which may reach the ignition temperature of carbon steel. In this instance, however, the carbon steel surface is protected by a fused coating 12 of the aforementioned chromium-containing, nickel-base alloy of the Inconel 82 type, among others.

Figure 3:
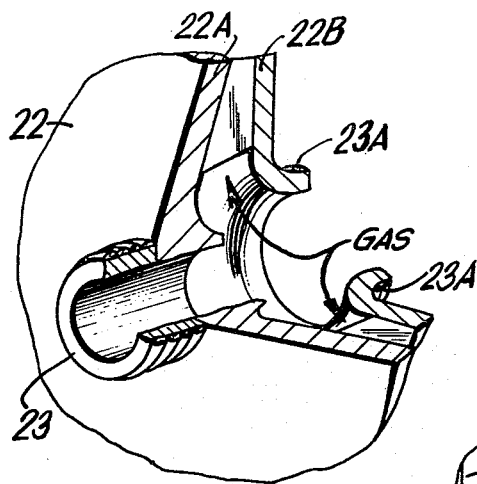
FIG. 3 is a fragment of an impeller wheel showing the hub thereof inlaid with a corrosion and heat resistant alloy.

Referring to FIG. 3, a partial section of an impeller 22 is shown with its hub 23 coated adjacent the front side 22A with a deposit 23 of a corrosion and heat resistant layer as shown prior to the machining of teeth therein. The back side of the impeller at the base 23A (surface of revolution) thereof also has a weld deposit thereon. Following application of the coating, it is precision machined to size with teeth machined therein (note FIGS. 1 and 2).

As will be noted from FIG. 3, the impeller has an opening through which gas to be compressed is fed as shown by the arrows, the gas travelling upwards between the vanes by centrifugal force and subjected to compression.

Figure 4:
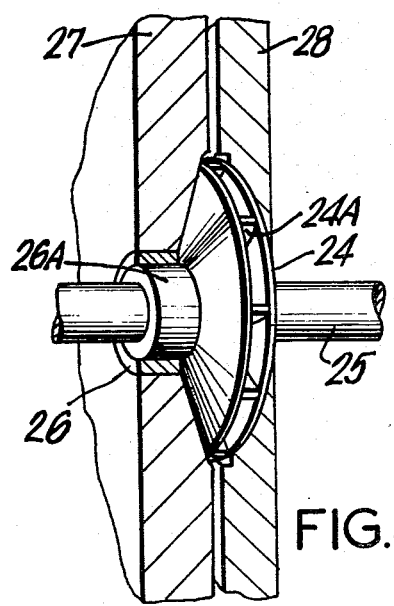
FIG. 4 is a sectional view of an impeller element showing a stationary seal completely surrounding and in sealing relationship with the hub of said impeller.
Figure 5:
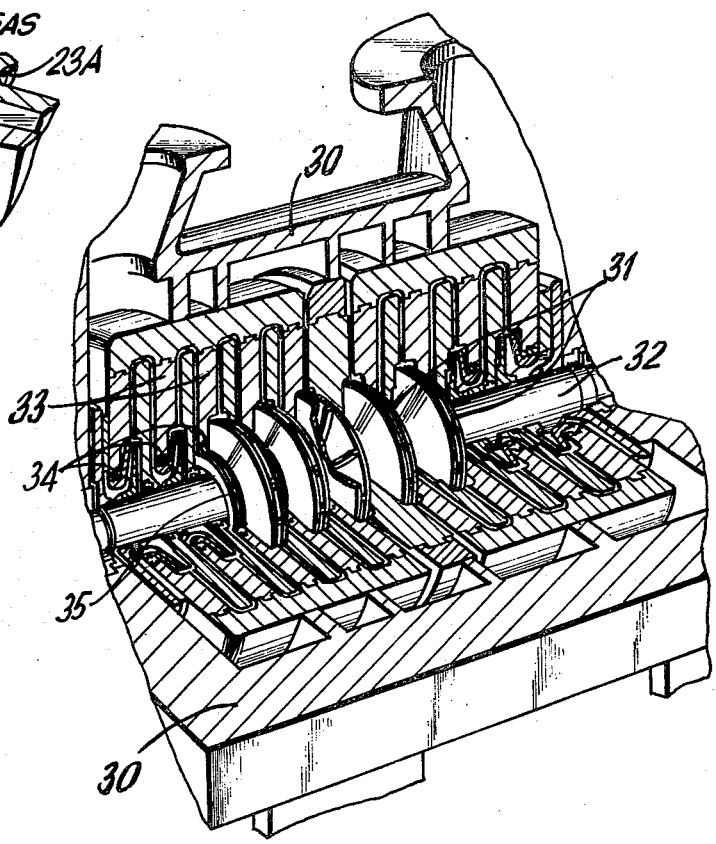
FIG. 5 is a partial section of a milti-stage compressor showing the relationship of the rotary impeller elements with the stationary seal elements.

In FIG. 4, an impeller 24 with vanes 24A is shown mounted on a rotatable shaft 25 supported by journals (not shown), the hub of the impeller being in sealing relationship with plastic ring seal 26 shown in partial section, the seal being supported by seal holders 27, 28 which in turn are supported by the casing as shown in FIG. 5. The hub or shaft of the impeller would be coated as shown in FIG. 3.

FIG. 5 shows in partial section, a multi-stage compressor useful in compressing dry chlorine gas. The compressor comprises a casing 30 with a multi-stage arrangement of impellers 31 mounted coaxially on a rotary shaft 32 supported by journals (not shown). Seal holding members 33 are provided having a wear ring element 34 mounted thereon, the holding member extending generally coaxially about the rotatable shaft 32, the wear ring element being in sealing relationship with a hub 35 of the impeller wheel 31 as shown.

The seal is preferably made of plastic, such as the material known by the trademark Teflon (polytetrafluoroethylene) having finely divided alumina dispersed throughout the matrix of the plastic seal, the seal being a sintered composition of said Teflon-alumina combination. The ring seal is also shown in FIG. 4 as the element 26 surrounding hub 26A of impeller wheel 24. The hub 26A in FIG. 4 and the hub 35 and also the seal surface of the coverplate in the case of FIG. 5 would be coated with the heat and corrosion resistant alloy referred to hereinbefore with teeth finish machined therein to cut into the seal during rotation.

The alloy in the form of a welding rod may be employed in depositing the alloy on the rotatable cylindrical surface disposed in sealing relationship with the ring seal.

Various processes may be employed for laying down the weld metal on the surface. The method of forming the deposit may include gas tungsten-arc welding, gas metal-arc welding, submerged-arc welding, and the like.

In laying down the alloy referred to by the trademark Inconel 82, we employ a weld wire of the alloy and deposit it as follows.

In preparing the base metal substrate for receiving the weld overlay, the areas adjacent to the impeller are preferably prepared by machining.

The substrate is preheated to a temperature within the range of about 150° F to 300° F (65° C to 150° C) and a filler wire of the alloy Inconel 82 (trademark) employed in making the weld, using gas tungsten-arc welding or any of the other welding techniques mentioned herein. The welding is carried out in the flat position as defined by the American Welding Society and an overlay of about ⅜ inch thick applied on each side of the impeller.

A first layer of weld beads is applied and all slag removed before applying the next layer. Also, any cracks or blowholes that form on the surface of the first layer are removed by gouging, chipping or grinding before the next layer is applied, the next layer being similarly treated, if necessary.

In this way, a good quality overlay is assured. Following completion of the welding, the deposited coating is subjected to a post weld heat treatment by heating to a temperature of about 50° F (10° C) below the tempering temperature of the steel. Following the heat treatment, the coating is inspected for cracks and/or blowholes before and after machining, using well known inspection techniques, such as the use of a liquid penetrant.

The ⅜ inch coating is first rough machined and then finish machined to provide teeth as shown in FIGS. 1 and 2, the base of the coating below the root of the teeth being machined to about ¼ inch thick. The coating thickness at the weld before machining is generally below one-half inch, depending upon the size of the element being protected and may generally range between about 0.1 and 0.375 inch in thickness.

The coating is fully machinable by conventional machining methods.

Generally speaking, as stated hereinbefore, the alloy is a chromium-containing nickel-base alloy of the type containing 10% to 30% by weight of chromium and the balance at least about 60% nickel.

Examples of nickel-base coating welding alloys that may be employed are given in the 8th Edition of the Metals Handbook entitled *Welding and Brazing* and published by the American Society of Metals (1971).

The foregoing handbook also discloses methods for producing weld overlays.

As illustrative of some surface coating nickel-base weld alloys that may be employed, the following examples are given in the table below.

TABLE

| Element | Percent by Weight | | |
|---|---|---|---|
| | Alloy No. 1 | Alloy No. 2 | Alloy No. 3 |
| Ni | 67 min. | bal. | 60.5 |
| Cr | 18 – 22 | 20 – 23 | 23 |
| C | 0.1 | 0.1 | 0.05 |
| Mn | 2.5 – 3.5 | 0.5 | 0.5 |
| Si | 0.5 | 0.5 | 0.25 |
| Cu | 0.5 | — | 0.25 |
| Fe | 3.0 | 5.0 | 14.1 |
| Co | — | 1.0 | — |
| Al | — | 0.4 | 1.35 |
| Ti | 0.75 | 0.4 | — |
| Nb+Ta | 2.0 – 3.0 | 3.15 – 4.15 | — |
| Mo | — | 8 – 10 | — |
| Others | 0.5 | — | — |

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In rotary machinery, including a wear ring seal member stationarily mounted in a holding member so as to extend generally coaxially about a rotatable cylindrical member in substantially sealing relationship with the surface of said rotatable member, said rotatable member being made of a low alloy carbon steel, the improvement,
    wherein the surface of said rotatable cylindrical member is substantially completely covered by a fused welding alloy coating metallurgically bonded thereto,
    said weld coating being formed of a heat and corrosion resistant alloy composition containing by weight about 10% to 30% chromium and the balance at least about 60% nickel.

2. In rotary machinery, including a wear ring seal member stationarily mounted in a holding member so as to extend generally coaxially about a rotatable cylindrical member in substantially sealing relationship with the surface of said rotatable cylindrical member, said rotatable member being made of a low alloy carbon steel, the improvement,
    wherein the surface of said rotatable cylindrical member is substantially completely covered by a fused welding alloy coating metallurgically bonded thereto,
    said weld coating being formed of a heat and corrosion resistant alloy composition containing by weight:
    up to about 0.25% C, about 0.5% to 5% Mn, 0 to about 5% Fe, 0 to about 1% Si, 0 to about 1% Cu, about 0.1 to 1% Ti, about 10% to 30% Cr, about 0.5% to 5Nb+Ta and the balance at least about 60% Ni.

3. The rotary machinery of claim 2, wherein said alloys contains by weight approximately 0.1% C, 2.5% to 3.5% Mn, 3% Fe, 0.5% Si, 0.5% Cu, 0.75% Ti, 18% to 22% Cr, 2% to 3% Nb+Ta and the balance at least about 67% Ni.

4. In a multi-stage compressor for compressing chlorine gas comprising a plurality of impellers with hubs supported coaxially by a rotatable shaft, including a series of wear ring seal members each stationarily mounted in a holding member so as to extend generally coaxially about each of said impeller hubs in substantially sealing relationship therewith, said impellers being made of a low alloy carbon steel, the improvement
    wherein the hub surface of each of said impellers is substantially completely covered by a fused welding alloy coating metallurgically bonded thereto,
    said weld coating being formed of a heat and corrosion resistant alloy composition containing by weight about 10% to 30% Cr and the balance at least about 60% Ni,
    whereby said low carbon steel is protected against ignition due to heat of friction in the presence of chlorine gas.

5. The multi-stage compressor of claim 4, wherein said alloy coating contains by weight:
    up to about 0.25% C, about 0.5% to 5% Mn, 0 to about 5% Fe, 0 to about 1% Si, 0 to about 1% Cu, about 0.1 to 1% Ti, about 10% to 30% Cr, about 0.5% to 5% Nb+Ta and the balance at least about 60% Ni.

6. The multi-stage compressor of claim 5, wherein said alloy coating contains by weight approximately 0.1% C, 2.5% to 3.5% Mn, 3% Fe, 0.5% Si, 0.5% Cu, 0.75% Ti, 18% to 22% Cr, 2% to 3% Nb+Ta and the balance at least about 67% Ni.

* * * * *